Feb. 12, 1952      C. JOHNSON      2,585,329
MACHINE TOOL MOVEMENT CONTROL
Filed April 22, 1947      3 Sheets-Sheet 2

INVENTOR.
Clarence Johnson
BY
Hoodling and Krost
attys.

Feb. 12, 1952     C. JOHNSON     2,585,329
MACHINE TOOL MOVEMENT CONTROL
Filed April 22, 1947     3 Sheets-Sheet 3
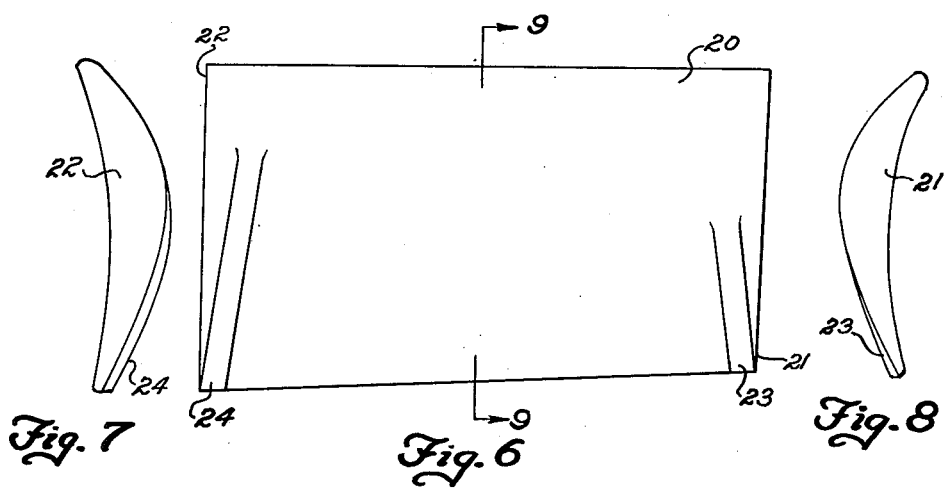
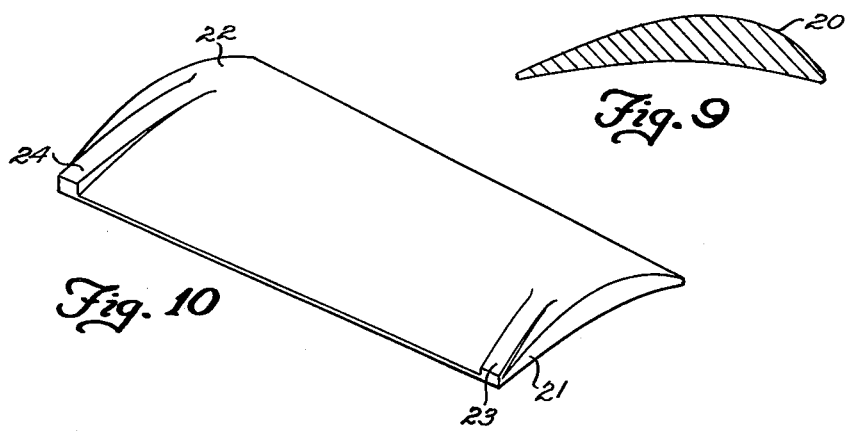
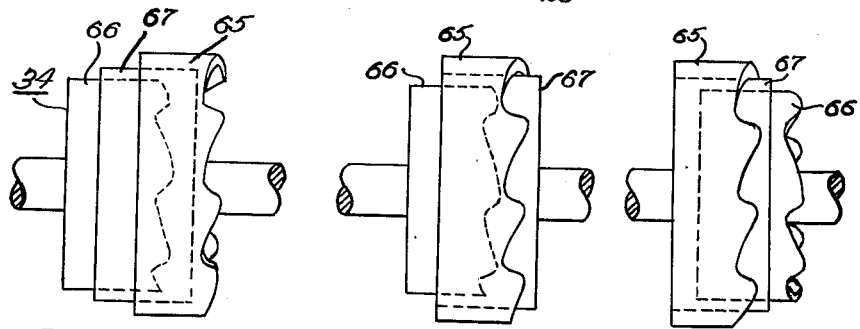
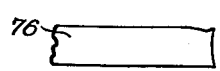
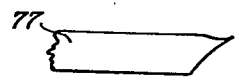
INVENTOR.
BY Clarence Johnson
Woodling and Krost
attys Patented Feb. 12, 1952

2,585,329

UNITED STATES PATENT OFFICE 2,585,329

MACHINE TOOL MOVEMENT CONTROL

Clarence Johnson, Orfordville, Wis., assignor to Bailey Meter Company, a corporation of Delaware Application April 22, 1947, Serial No. 743,158

8 Claims. (Cl. 90—24.5)

My invention relates to machine tools in general, and more particularly to an automatic tracer control system for machine tools.

An object of my invention is to provide a control system for a machine tool capable during the cutting operation of producing an infinite combination of longitudinal advance and retract and lateral advance and retract relative movement between a workpiece and tool holder.

Another object of my invention is to provide independent power means for the longitudinal advance and retract movement of a tool holder in a machine tool, and independent power means for the lateral advance and retract movement of the tool holder, each having a pattern directed tracer control system for producing during the cutting operation an infinite combination of relative movements between a workpiece holder and tool holder.

Other objects and a fuller understanding of my invention may be had by referring to the following description and claims, taken in conjunction with the accompanying drawing, in which:

Figures 6, 7 and 8 are plan and end views of a workpiece machinable by my improved machine tool illustrated in Figure 1;

Figure 9 is a cross-sectional view through the line 9—9 of Figure 6;

Figure 10 is a perspective view of the workpiece illustrated in Figure 6;

Figures 11, 12 and 13 are illustrations of the rotary carriage control nest of patterns illustrating the various combinations of positions to expose the various patterns of the nest for operation.

Figure 14 is a cutting tip end of a cutting tool; and

Figure 15 is a cutting tip end of a cutting tool.

Figure 1:
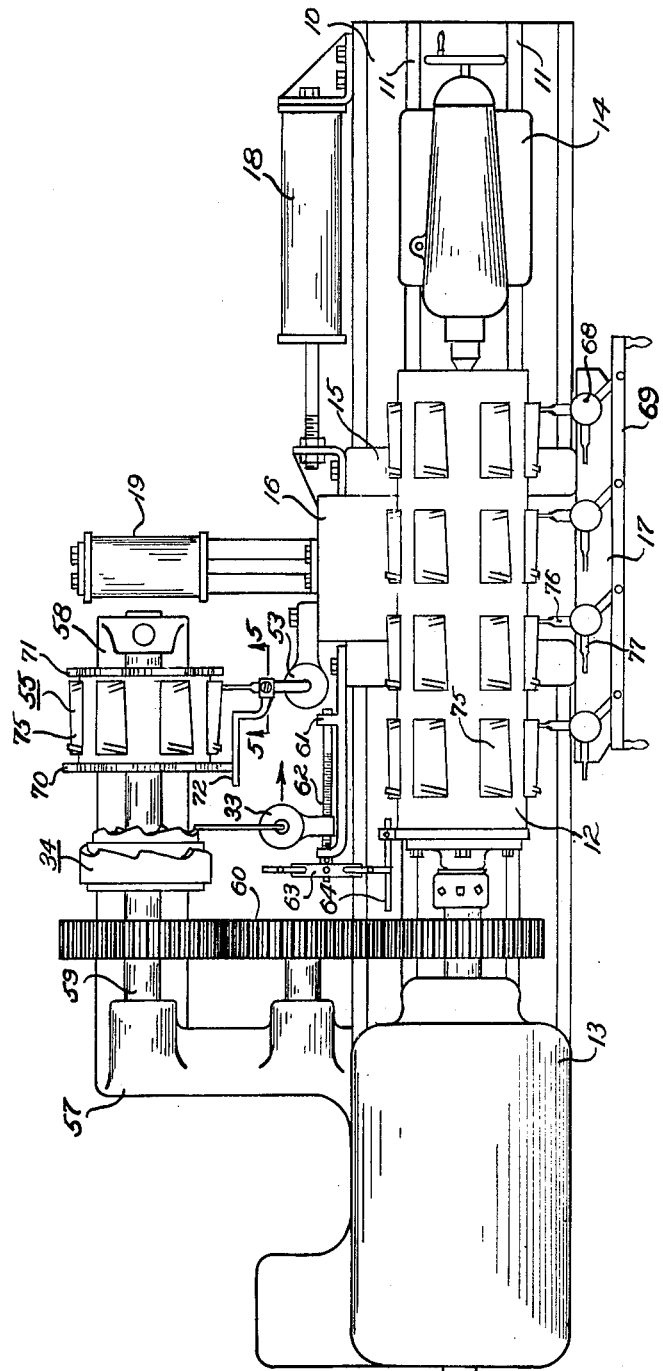
Figure 1 is a top view of the preferred embodiment of my invention.

In the Figure 1 of the drawing, I illustrate a machine bed 10 having longitudinal ways 11. For the particular workpiece with which the present embodiment is illustrated, a mounting drum 12 is rotatably mounted relative to the bed 10. A driving motor 13 is employed to support one end of and rotatably drive the drum, and a tailstock 14 is employed to rotatably support the opposite end of the drum 12.

A carriage 15 is adapted to move longitudinally of the bed 10 upon the ways 11. A cross-slide 16 is mounted for cross movement upon the carriage 15 laterally of the rotatable drum 12. That is, the cross-slide 16 is carried by the carriage 15, and is also movable relative to the carriage. A suitable tool holder 17 is mounted to move with the cross-slide. Therefore, the tool holder 17 will receive longitudinal movement in accordance with the longitudinal movement of the carriage 15, and will receive lateral movement by the cross movement of the cross-slide 16 upon the carriage 15. Therefore, the tool holder 17 may move in any desired path relative to the drum 12 by manipulation of the carriage 15 and the cross-slide 16.

In the preferred embodiment of my invention as illustrated, a longitudinal hydraulic cylinder power means 18 is adapted to drivingly move the carriage 15 upon the ways 11, and a similar power means 19 is adapted to move the cross-slide upon the carriage 15. The power means 18 is mounted stationarily with respect to the bed 10. The power means 19 is carried by the carriage 15 and is therefore stationarily mounted relative to the carriage 15, and is adapted to cause the cross movement of the cross-slide 16 relative to the carriage 15. Generally, my invention comprises a first pattern directed pneumatic tracer system to control the relative movement of a tool holder and a workpiece holder in a first path, and a second pattern directed pneumatic tracer system to control relative movement of the tool holder and workpiece holder in a second path angularly related to said first path. The first system is independent of any other factor in the machine and directs either advance or retract movements in said first path, or is adapted to stop the first path relative movement. The second system is also independent of any other factor in the machine and directs either advance or retract movements in said second path, or likewise to stop the second path relative movement. In the machine illustrated therefore, the cross-slide is capable of movement in either direction regardless of whether the carriage is advancing or retracting or if the carriage is standing stationary. Also, the carriage is capable of movement in either direction regardless of whether the cross-slide is advancing or retracting, or if the cross-slide is standing stationary. The outstanding advancement to the machine tool art provided by my invention, is the freedom of control for movement of the workpiece relative to the tool holder during cutting operation. However, the control is also useful for relative movement of the tool holder and workpiece holder during non-cutting operations. Although reference is made to a carriage and cross-slide in the machine illustrated, it is understood that this control is meant to apply to machine tools generally in which movement in two directions angularly related to one another are coupled as components of a compound movement. Therefore, the description would apply equally to the movement of a workpiece in a mill or shaper and other similar machines.

In the Figures 6 through 10, I have illustrated a particular example of one type workpiece which may be machined by a machine tool made in accordance with my invention. In these figures, a turbine blade 20 is illustrated. This blade is tapered from a small end 21 to a large end 22. Also, a rib 23 on the small end 21 and a rib 24 on the large end 22 are of different widths and different curvature from the curvature of the adjacent blade sections, and are different from one another. The difference in curvatures is illustrated in the Figures 7 and 8, and a comparison is provided in the Figure 9 showing the curvature of the blade through the cross-sectional area indicated by the line 9—9 in the Figure 6. Obviously, a complicated tool movement is required to accurately machine the surface of the blade 20.

After many experiments with conventional machine tool controls of all types, I have discovered that the key to the solution of control in machining this type of workpiece surface is basically the provision of independent control systems to independently control the cross-slide movement and carriage movement. That is, I have found that the lateral component of movement of the tool holder 17 must be independent and not dependent upon the relative longitudinal position of the carriage to the workpiece. Further, I have discovered that single degrees of freedom provided by conventional progressive movement of the carriage 15 is impractical to solve this problem, and that the carriage as well as the cross-slide must be free to move with two degrees of freedom in either an advance or retract direction in order to accomplish the purpose desired.

Throughout this description, and in the claims, the control system and power means to operate the carriage will be referred to as the carriage operating means, and the control system and power means to operate the cross-slide will be referred to as the contour operating means.

Figure 2:
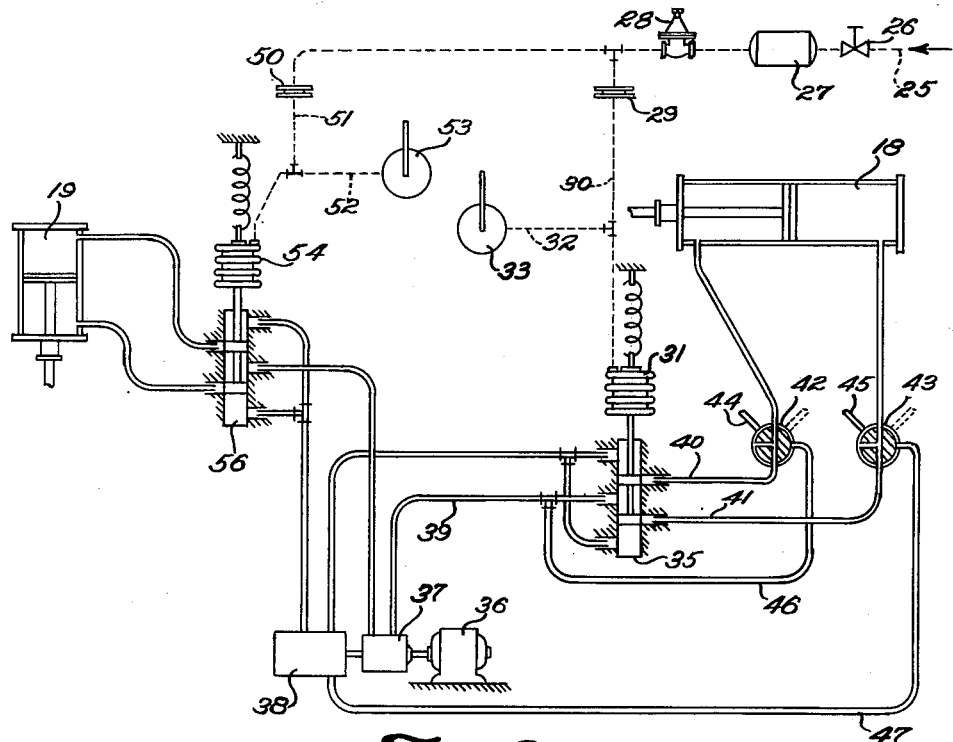
Figure 2 is a schematic diagram of the preferred pneumatic hydraulic control system for the device illustrated in the Figure 1.

With reference to the Figure 2, air is conducted from any convenient air supply source through a pipe line indicated diagrammatically in the Figure 2, and bearing the reference character 25. A control valve 26, a compensating device 27, and a pressure valve 28 operates to substantially eliminate fluctuations of pressure from the supply source, and deliver a substantially constant supply of air.

From a practical standpoint, only one such air supply system is employed for both the carriage operating means used for controllably moving the carriage, and the contour operating means used for controllably moving the cross-slide. However, individual sources of supply could just as well be used. That is, the air supply system described serves both operating means, but is in reality a common element of two independent systems.

The carriage operating means for controllably moving the carriage includes an orifice 29 adapted to limit the amount of air passing therethrough. A pipe header 30 extends from the orifice 29 to a pressure responsive bellows 31, and a side member 32 of the header 30 extends to a carriage tracer 33. In the Figure 1 of the drawing, the tracer 33 and a rotatable nest of patterns 34 is illustrated. Further, in the Figures 11, 12 and 13, the specific structure of the nest of patterns 34 is illustrated. The tracer 33 is adapted to be actuated by the pattern 34 to variably discharge air from the header system 30. Thus, a variable pressure condition is produced in the header 30. This variable pressure condition is possible, because of the restricting influence of the orifice 29 to the passage of air. Accordingly, the bellows 31 will respond to the variation thus produced. Therefore, it may be said that the bellows 31 is operated responsively to the form of the nest of patterns 34.

A carriage control valve 35 is adapted to be operated by the movement of the bellows 31. That is, as diagrammatically illustrated in the Figure 2, the valve 35 is operatively connected to the bellows 31. Therefore, as the bellows 31 responds to the variations of pressure in the header 30, the valve will be operated to control and direct the flow of fluid therethrough to control the operation of the power means 18.

I have diagrammatically illustrated a supply and storage sump 38 and a motor 36 operating a fluid pump 37. Fluid under pressure is directed from pump 37 to the valve 35 through a pipe line 39. The fluid is then directed by the valve 35 through either lead line 40 or lead line 41. Thus, it is readily apparent, that the movement of the power means 18 to drive the carriage 15 is directly responsive to the movement of the bellows 31, which, as previously explained, is directly movable in response to the form of the nest of patterns 34. In other words, the movement of the power means 18 and the carriage 15 is directly responsive to the form of the nest of patterns 34. The carriage may thereby be advanced or retracted as desired by the provision of suitable forms in the nest of patterns 34.

There are instances during operation of a machine tool such as illustrated in the Figure 1, wherein it is desired to reverse the carriage movement rapidly from left to right with the tool out of cutting relationship with the workpiece. In order to accomplish this end, I have provided valve means 42 and 43 in the lines 40 and 41 respectively. These are simple directional valves, and may be operated singularly or as a unit. These valves 42 and 43 serve to entirely defranchise the carriage control valve 35 and operate the power means 18 directly from the fluid pressure pump 37 without regard to the position of the valve 35. That is, by shifting the valves to the position indicated by the phantom position of the handle members 44 and 45, the lead line 40 is rendered inoperative, and the power means 18 is connected directly to the pipe 39 by means of the shunt line 46. Likewise, the lead line 41 is rendered inoperative, and the power means is connected directly to the sump 38 by means of shunt line 47. By this connection, the fluid is directed from the pump 37 through the pipe 39, through shunt line 46 to the power means 18. Fluid is exhausted from the power means 18 through the valve 43 and the shunt line 47 directly to the sump 38. With the fluid flowing as thus described, there is no directional or rate of travel control on the flow of the fluid, and high pressure fluid will be directed to the power means 18 and cause rapid return movement thereof to position the carriage rapidly to the right as pictured in the Figure 1.

The contour operating means for controllably moving the cross slide includes an orifice 50, a header system 51 having a side member 52 thereof leading to a contour tracer 53, and a pressure responsive bellows means 54. The tracer 53 is adapted to scan a rotatable contour pattern indicated generally by the reference character 55 in the Figure 1 of the drawings. Accordingly, air is variably discharged by the tracer 53 in accordance with the form of the tracer 55, and a variable pressure is produced in the header 51. The bellows 54 responds to these variations in pressure, and is adapted to position a cross-slide control valve 56 to direct fluid from the pump 37 to the power means 19 for advance or retract movement.

It is seen from the foregoing description of the independent carriage and cross-slide controls, that the movement of the carriage is entirely dependent upon the chosen form of one pattern, and the movement of the cross-slide is entirely dependent upon the chosen form of another pattern. Therefore, an infinite variety of movements are obtainable by selection of the form of the patterns 34 and 55. The carriage may advance or retract regardless of the simultaneous function of the cross-slide, and similarly the cross-slide may be advancing or retracting regardless of the movement of the carriage. Freedom of movement is thereby afforded without restriction.

In the illustrated embodiment of my invention for maching the surface of a turbine blade 20 as illustrated in the Figures 6 through 10, certain specific features are incorporated. For example, the nest of patterns 34 and the contour pattern 55 are rotatable. In the Figure 1 of the drawing, I have illustrated a pattern stand 57 comprising a base 58 and a rotatable shaft 59. The nest of patterns 34, and the contour pattern 55 are mounted on the shaft 59 for rotation therewith, and the shaft 59 with the patterns 34 and 55 thereon are rotatably driven by a train of gears 60. Thus, the pattern 34 and the pattern 55 rotate in the same direction as the drum 12.

Observation of the workpiece 20 will indicate that the tool movement relative to the workpiece in a longitudinal direction will have to be rapidly advancing and retracting as the machining operation is performed in the vicinity of the rib 23 on the end 21, or in the vicinity of the rib 24 on the end 22. However, between the rib members 23 and 24 the tool movement will only be required to be steadily advancing to cut an adjacent swath as the workpiece passes by the tool.

In order to accomplish this complicated longitudinal movement control, I have provided a tracer mounting device 61 mounted upon the carriage 15 by any suitable means. A rotatable screw member 62 on said tracer mount 61, is rotatably driven by any suitable means, such as by the spoked wheel 63 drivingly attached to the screw 62. A revolving striking member 64 is rotatably attached to the drum 12 and is adapted to strike one of the spoke members on the wheel 63 upon each revolution of the drum 12, and thereby cause rotation of the screw member 62. The tracer 33 is provided with threadable engagement means, and is thereby threadably mounted upon the screw 62. Therefore, as the screw member 62 is rotatably driven by the wheel 63, the tracer 33 is adapted to move relative to the carriage in the direction indicated by the directional arrow, that is, to the right in the Figure 1.

The inherent characteristic of the control system employing the variable discharge to atmosphere, is to maintain the tracer at a position relative to the pattern which will exhaust a predetermined amount of air through the tracer. Therefore, when the pattern is provided with a protrusion, the following finger of the tracer is moved to allow a different rate of discharge than the predetermined value. A change in discharge immediately activates the system to position the carriage and the tracer relative to the pattern in order to re-establish the predetermined discharge. It is this basic principle which is employed in the tracer system described in order to cause tracer control of the carriage and cross-slide movement. Therefore, in the mounting 61 described, it will be seen that the tracer is constantly moving toward the right relative to the carriage 15. Accordingly, the carriage 15 is constantly being moved to the left in the illustration Figure 1 in order to keep the tracer 33 at a given predetermined position relative to the pattern 34. The pattern 34, however, has two nest parts with formed pattern faces which continually tend to upset the constant discharge through the tracer 33, and therefore cause a superimposed movement upon the carriage 15. By analogy, this movement may be compared to electric impulses or sound waves. The regular advanced movement caused by the movement of the tracer relative to the carriage is likened to the main electrical or sound wave, and the extra movement caused by the form of the particular pattern agitating the tracer 33 is likened to the harmonics relative to the first or main wave.

In the Figures 11, 12 and 13, the nest of patterns 34 is illustrated in enlarged dimensions. The nest 34 comprises a pattern 65 corresponding to the lateral movement of the tool required to machine the rib 24, a pattern 66 corresponding to the movement of the tool to machine the rib 23, and a pattern 67 having a smooth surface adapted to contact the tracer 33 and allow only the regular advancement due to the movement of the tracer 33 relative to the carriage 15 on the mounting bracket 61.

During operation of my improved machine tool, the carriage operating means for controllably moving the carriage operates in the following order: With the tool holder 17 in the position illustrated in Figure 1 of the drawings, a rapid advance and retract movement is required of the tool holder in order to allow the tool to follow the diagonal path of the rib 23. Also, a steady advancement of the tool is required in order to progress across the rib 23. The rapid advance and retract movement is provided by the form face on the pattern 66 of the nest 34, and the steady advance across the rib 23 is provided by the relative movement of the tracer 33 relative to the carriage 15.

After the movement of the tracer 33 relative to the carriage 15 has caused the advance and retract movement of the tool holder 17 to move past the rib 23, the nest of patterns 34 is shifted in order to position the pattern 67 to contact the tracer 33. Therefore, the pattern 67 having a smooth pattern form, the carriage will be advanced to move the tool holder 17 steadily along the workpiece 20 in response to the movement of the tracer 33 relative to the carriage 15. This position of operation is carried out until the tool holder has advanced the tool to the rib 24. Thereafter, the nest of patterns 34 is shifted into the position illustrated in the Figure 11, and the pattern 65 causes the carriage to move the tool holder 17 in a rapid advance and retract movement to produce the diagonal rib 24.

Simultaneously with the operation thus described, the lateral movement of the tool holder 17 is provided by the controlled operation of the cross-slide 16 upon the carriage 15. This movement is provided by the tracer 53 in response to the form of the rotatable pattern 55. The tracer 53 is stationarily mounted with respect to the cross-slide 16, and is therefore adapted to move with the cross-slide 16.

In the particular form of the workpiece illustrated, a tool problem is encountered in machining the rounded nose 48 of the workpiece. Those acquainted with the machine tool trade will be aware that a different tool form will be required to machine the rounded nose 48 than is required to machine the top surface of the workpiece 20. These tool forms are illustrated in the Figures 14 and 15. It is readily apparent from these figures, that a tool suitable for cutting the nose 48 of the workpiece 20 would be positioned at an unworkable angle to machine the top part of the workpiece 20. Therefore, I have provided a turret type tool mounting 68 adapted to hold both tools. A compound position setting device 69 will position the selected tool for operation.

Figure 3:
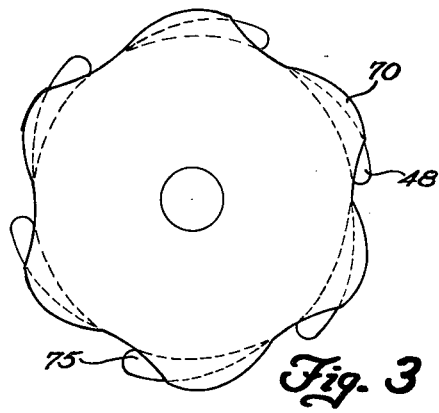
Figure 3 is one end view of the rotary contour pattern.
Figure 4:
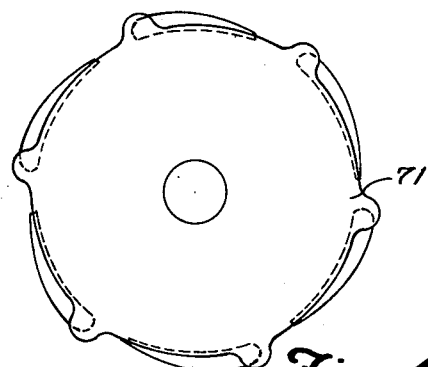
Figure 4 is an end view of the opposite end of the rotary contour pattern.
Figure 5:
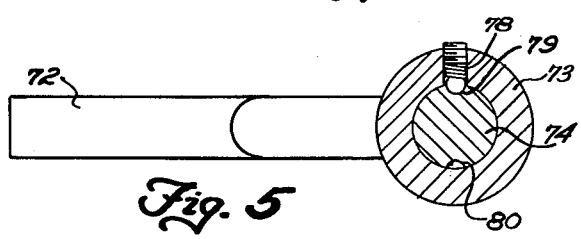
Figure 5 is a view of the tracer finger with a masking template follower attached thereto.

In the Figures 3 and 4, I have illustrated two masking templates 70 and 71. It will be noted that the mask 70 has a form extending above the top portion of the workpiece contour pattern and exposing the nose 48, whereas the mask 71 has a portion extending above the nose portion 48 of the workpiece contour pattern, and exposing the top of the contour pattern. In the Figure 5, I illustrate in more detail the mask riding member 72 attached to the follower finger 74 of the tracer 53. A collar member 73 is bearinged on the follower 74. A spring and ball catch 78 in the collar 73 is adapted to engage with a depression 79 on the follower 74 to lock the rider 72 in position to engage the mask 70. The rider 72 is rotatable about the follower 74 to engage the mask 71, and is held in position relative to the mask 71 by engagement of the catch 78 with the depression 80.

The mask members 75 are complete contour patterns of the workpiece 20. However, because of tool forming difficulties only a portion of the workpiece 20 may be cut during each operation. Therefore, the tool holder is positioned as illustrated in the Figure 1, with the mask riding member 72 positioned to contact the mask 70, and the tool 76 is moved to the operative position to cut the nose part 48. Accordingly, the tool 76 will be held out of contact with the top of the workpiece 20, and will cut only the nose portion 48. A complete cut across the member 20 from the end 21 to the end 22 is carried out with the member 72 riding the mask 70. Thereafter, the tool holder 17 is returned to the starting position illustrated in the Figure 1, the mask riding member 72 is pivoted to contact the mask 71, and the tool 77 is moved to the operative position. Therefore, the tool 77 will be held out of contact with the nose 48, and will cut only the top portion of the blade 20. Thus, in two complete longitudinal trips across the pattern, one set of workpieces 20 is completely machined.

Although I have described my invention with a certain degree of particularity in its preferred form, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A machine having a carriage and cross slide mounted on the carriage, a carriage operating means including a first hydraulic motive means for controllably moving the carriage, and contour operating means including a second hydraulic motive means for controllably moving the cross slide, said carriage operating means including a rotatable pattern for directing movement of the first hydraulic motive means and carriage, carriage tracer means adapted to scan said rotatable pattern for carriage operation, mounting means to mount said carriage and tracer for movement with the carriage, means to shift the tracer on said mounting means relative to the carriage, said first hydraulic motive means being progressively advanced responsively to said shifting movement independently of special movements produced as a result of pattern form, said contour operating means including a rotatable contour pattern, contour tracer means adapted to scan said contour pattern for cross slide and control to direct movement of the second hydraulic motive means and cross slide, mounting means to mount said contour tracer for movement with the cross slide, said contour tracer and rotatable contour pattern being in complete control of cross slide movement independent of carriage movement.

2. A machine having a carriage, a carriage operating means including motive means for controllably moving the carriage, a pattern for directing movement of the motive means and carriage, tracer means adapted to scan said pattern for carriage operation, mounting means to mount said tracer for movement with the carriage including a screw member rotatably mounted on said carriage, threadable engagement means adapted to mount said tracer on said screw, and means to rotate said screw, said carriage motive means being progressively advanced responsively to the shifting of the tracer along said screw independently of special movements produced as a result of pattern form.

3. A machine having a carriage, carriage operating means including motive means for controllably moving the carriage, a pattern element for directing movement of the motive means and carriage, a tracer element adapted to scan said pattern element for carriage operation, mounting means to mount one of said elements for movement with the carriage including a screw member mounted on said carriage, threadable engagement means adapted to mount said one of said elements on said screw, means to rotate one of said screw and threadable engagement means, said carriage motive means being progressively advanced responsively to the shifting of the tracer element along said screw independently of special movements produced as a result of pattern form, a slide on said carriage, slide operating means including second motive means for controllably moving the slide, pattern means and tracer means adapted to cooperate to control said second motive means, and means to provide relative movement between said pattern and tracer means in accordance with the movement of said slide relative to said machine.

4. A machine having a carriage and cross slide mounted on the carriage, carriage operating means including first motive means for controllably moving the carriage, and contour operating means including second motive means for controllably moving the cross slide, said carriage operating means including a movable pattern for directing movement of the first motive means and carriage, carriage tracer means adopted to scan said movable pattern for carriage operation, mounting means to mount one of said carriage tracer and pattern for movement with the carriage, and means to shift said one of said carriage tracer and pattern on said mounting means relative to the carriage, said first motive means being progressively advanced responsively to said shifting movement independently of special movements produced as a result of pattern form, said contour operating means including a movable contour pattern, contour tracer means adapted to scan said contour pattern for cross slide control to direct movement of the second motive means and cross slide, and mounting means to mount one of said contour tracer and pattern for movement with the cross slide, said contour tracer and movable contour pattern being in complete control of cross slide movement independent of carriage movement.

5. In combination with a lathe having a rotatable work holder, a carriage and a cross slide mounted on the carriage, a tool holder mounted on said cross slide, the provision of carriage operating means and contour operating means, said carriage operating means including a first hydraulic motive means for controllably moving the carriage, a carriage pilot valve for controlling the speed and direction of movement of the first hydraulic motive means and carriage, a first pattern device, first pattern controlled pressure means including a first tracer device to scan said first pattern device, said carriage pilot valve being operatively controlled by said first pattern controlled pressure means, mounting means to provide relative movement between said devices in accordance with the movement of said carriage relative to said lathe, and means to relatively shift the positions of said devices to progressively advance said first hydraulic motive means independently of special movements produced as a result of pattern form, said contour operating means including, a second hydraulic motive means for controllably moving the cross slide, a contour pilot valve controlling the speed and direction of movement of the second hydraulic motive means and cross slide, a second pattern device, and second pattern controlled pressure means including a second tracer device to scan said second pattern device, said contour pilot valve being operatively controlled by said second pattern controlled pressure means, whereby compound movement of the tool holder is provided as a resultant of independent movements controlled by the independent operation of the first and second pattern and tracer devices.

6. In a machine tool having a carriage, carriage motive means to longitudinally move the carriage, a cross slide mounted for lateral movement on the carriage, and cross slide motive means to laterally move the cross slide, the provision of a first pattern controlled tracer system for controlling the longitudinal movement of the carriage, and a second pattern controlled tracer system for controlling the lateral movement of the cross slide, said first system including a rotatable first pattern device comprising a telescoping nest of a plurality of patterns, said rotating nest of patterns being shiftable relative to one another to selectively position one pattern for operation and position the remainder to inoperative position, a carriage tracer device to scan the selected pattern of said first pattern device, first control means operated by said carriage tracer device responsive to the relative position of the carriage tracer device and said selected pattern; said carriage motive means being operably controlled by said first control means for moving the carriage, mounting means to provide relative movement between said devices in accordance with the movement of said carriage relative to said machine tool, and means to relatively shift the positions of said devices to progressively advance said carriage motive means independently of special movements produced as a result of pattern form, said second system including a rotatable contour pattern, a contour tracer adapted to scan said contour pattern, and second control means operated by said contour tracer responsive to the relative position of the contour tracer and rotatable contour pattern, said cross slide motive means being operatively controlled by said second control means for moving the cross slide, said contour tracer and rotatable contour pattern being in complete control of the cross slide movement independently of carriage movement.

7. A machine tool for machining irregular workpiece surfaces, comprising a workpiece holder, a carriage movable longitudinally relative to said workpiece holder, a cross slide mounted on said carriage and movable laterally thereof, tool holder means mounted on said cross slide, carriage operating means for controllably moving the carriage, and contour operating means for controllably moving the cross slide, said carriage operating means including power means to drive the carriage, a first pattern device for directing carriage movement, a first substantially constant source of fluid pressure, a first tracer device for carriage operation adapted to scan said first pattern device and variably discharge fluid from said first fluid pressure source and establish a variable pressure between said first pressure source and said first tracer device, first pressure responsive means movable responsively to said variable pressure, control means for said carriage power means operable by said first pressure responsive means, whereby the movement of the carriage is directed by said first pattern device, mounting means to provide relative movement between said devices in accordance with the movement of said carriage relative to said machine tool, and means to relatively shift the positions of said devices to progressively advance said carriage power means independently of special movements produced as a result of pattern form, said contour operating means including power means to drive the cross slide on said carriage, second pattern means for directing cross slide movement, second tracer means for cross slide operation adapted to scan said second pattern means and variably discharge fluid from said first fluid pressure source and establish a variable pressure between said first pressure source and said second tracer means, second pressure responsive means movable responsively to said variable pressure from the second tracer means, and control means for said cross slide power means operable by said second pressure responsive means, whereby the movement of the cross slide is directed by said second pattern means.

8. A machine having a first and a second slide, one of said slides carrying the other thereof, first slide operating means including motive means for controllably moving the first slide, a pattern device and a tracer device adapted to cooperate to control said motive means and first slide, means for mounting said pattern device and said tracer device for relative movement therebetween in accordance with relative movement between said first slide and said machine, screw and threaded engagement means adapted to mount one of said devices, means to actuate one of said screw and threaded engagement means to vary the tracing conditions between said devices to thus progressively advance said first slide in a direction tending to compensate for said varying tracing condition independently of special movements produced as a result of pattern form, second slide operating means including second motive means for controllably moving the second slide, pattern means and tracer means adapted to cooperate to control said second motive means, and means to provide relative movement between said pattern and tracer means in accordance with the movement of said second slide relative to said machine.

CLARENCE JOHNSON.

REFERENCES CITED

The following references are of record in the file of this patent:

UNITED STATES PATENTS

| Number | Name | Date |
|---|---|---|
| 6,843 | Goodman | Nov. 6, 1849 |
| 340,288 | Codling | Apr. 20, 1886 |
| 468,283 | Guerrant | Feb. 2, 1892 |
| 2,389,653 | Turchan | Nov. 27, 1945 |
| 2,402,450 | Salisbury | July 18, 1946 |
| 2,412,957 | Barnes | Dec. 24, 1946 |
| 2,420,547 | Lovely | May 13, 1947 |
| 2,422,682 | Johnson | June 24, 1947 |

FOREIGN PATENTS

| Number | Country | Date |
|---|---|---|
| 436,600 | Germany | Nov. 5, 1926 |